United States Patent [19]

Heeschen et al.

[11] Patent Number: 5,561,852
[45] Date of Patent: Oct. 1, 1996

[54] METHOD AND APPARATUS FOR ESTABLISHING A COMMUNICATION LINK

[75] Inventors: David R. Heeschen, Coconut Creek; Thomas V. D'Amico, Boca Raton, both of Fla.

[73] Assignee: Motorola, Inc., Schaumburg, Ill.

[21] Appl. No.: 269,511

[22] Filed: Jul. 1, 1994

[51] Int. Cl.⁶ ..................... H04B 1/00
[52] U.S. Cl. ............ 455/54.1; 455/51.1; 379/58; 379/61
[58] Field of Search ............ 455/32.1, 33.1, 455/34.2, 38.1, 39, 51.1, 51.2, 54.1, 56.1, 58.1, 31.1, 54.2; 370/95.1, 95.3, 85.2, 85.3, 95.2, 85.6, 105.4; 379/58, 59, 61

[56] References Cited

U.S. PATENT DOCUMENTS

| | | | |
|---|---|---|---|
| 4,001,693 | 1/1977 | Stackhouse et al. | 325/58 |
| 4,400,585 | 8/1983 | Kaman et al. | 179/2 |
| 4,414,661 | 11/1983 | Karlstrom | 370/95 |
| 4,667,191 | 5/1987 | Comroe et al. | 340/825.5 |
| 4,947,162 | 8/1990 | Kimura | 340/825.8 |
| 5,155,727 | 10/1992 | Borup et al. | 370/85.3 |
| 5,267,244 | 11/1993 | Messerschmitt et al. | 370/95.3 |
| 5,280,541 | 1/1994 | Marko et al. | 379/61 |
| 5,293,419 | 3/1994 | Hirano | 379/62 |

FOREIGN PATENT DOCUMENTS

| | | |
|---|---|---|
| 0386877A1 | 9/1990 | European Pat. Off. . |
| 0462572A2 | 12/1991 | European Pat. Off. . |
| 2229895 | 10/1990 | United Kingdom . |
| 2243974 | 11/1991 | United Kingdom ......... 455/34.1 |

OTHER PUBLICATIONS

*Reference Material*: Interim European Telecommunication Standard–prl–ETS 300 131, RI/RES–03–15, 31 Jan. 1994, Second Edition, European Telecommunicatons Standards Institute 1994.

*Primary Examiner*—Reinhard J. Eisenzopf
*Assistant Examiner*—Lee Nguyen
*Attorney, Agent, or Firm*—John G. Rauch; Barbara R. Doutre

[57] ABSTRACT

A portable radio (104) initiates a communication link using a synchronous protocol format. A base station (102) generates a synchronization pattern (200) which includes a marker. The marker (202) includes a generic code that invites portables to make link requests. The portable radio (104) synchronizes to the marker (202) and recognizes the generic code that indicates base availability. The portable radio (104) sends a link request in response to the generic code to initiate the communication link, and the base station (102) grants a link in order to establish the communication link.

11 Claims, 4 Drawing Sheets

METHOD AND APPARATUS FOR ESTABLISHING A COMMUNICATION LINK

TECHNICAL FIELD

This invention relates generally to communication systems, and more specifically to a method and apparatus for initiating a communication link from a portable radio to a base station.

BACKGROUND

Personal communication systems (PCS) operate using various protocols and standards of operation. These communication systems are often implemented in more than one country each having a separate governing body overseeing communication standards and regulations. In order for a communication system to be implemented into a country, the system must adhere to the standards specific to that country. Cordless telephone second generation (CT2) communication systems operate in accordance with a document entitled "MPT1375 Common Air Interface Specification" (CAI), Version prI-ETS 300 131, dated 31st Jan. 1994, which is published by the European Telecommunications Standards Institute and is hereby incorporated by reference. The CAI establishes a time-division multiplexed protocol having alternating one millisecond receive and transmit frames separated by guard time segments and is a standard adopted by most of the European community.

In a typical CT2 system, the communication protocol standard includes four main burst structures, called multiplex 3 (MUX3), multiplex 2 (MUX2), and multiplex 1 (MUX1) which is further subdivided into either multiplex 1.4 or 1.2 (MUX1.4 or MUX1.2). MUX3 is utilized mainly for communication link initiation (link establishment and re-establishment) between a portable radio and a base station. The MUX2 protocol employs a synchronization and data information exchange multiplex and is used primarily for communication link establishment and for link initiation from the base station. The MUX1 protocol is used primarily for voice/data communications, signaling information, and control messages between the portable to the base.

The current CAI protocol provides the following method for a portable radio to initiate a communication link to a base station. The portable selects a free channel and begins to transmit a non-synchronous link request using the MUX3 data format which has a transmit-to-receive ratio of 10:4. The base scans all frequencies in search of a link request. Because a base cannot synchronize to a portable, the structure of MUX3 is such that a base may examine slices of the transmitted data for the link request. Once the link request is recognized, the base begins to transmit a link grant to the portable in the MUX2 format. The portable synchronizes to the base's MUX2 transmission, recognizes the link grant, and terminates its MUX3 transmissions. The portable then begins to transmit in the MUX2 format using the base's synchronization. At this point a link is established in the MUX2 format, as well as the subsequent MUX1.2 format and MUX1.4 format, which has a transmit-to-receive ratio of 1:1.

When a base initiates a link to a portable, it foregoes the MUX3 format and uses the MUX2 format immediately. The portable scans all frequencies in search of an incoming call poll. Because the portable synchronizes to base transmissions, the MUX2 format can be read directly. Once the portable recognizes the poll, it responds with a link request in MUX2 which is subsequently answered by the base with a link grant. At this point a link is established in the MUX2 format, as well as the subsequent MUX1.2 format and MUX1.4 format, which has a transmit-to-receive ratio of 1:1.

When a portable initiates a link, it addresses a specific base or service (a specific grouping of bases) using a unique identification code which only the targeted base or service will recognize. Likewise, when a base initiates a link it addresses a specific portable using a unique identification code which only the targeted portable will recognize. Though it is possible for a base to target more than one portable by interleaving different codes, it must target each portable individually with the portable's unique code. This can become a problem, especially in a public base environment where thousands of portable radios, each having their own unique identification, code may be used.

In the United States the MUX3 format violates the transmit-to-receive ratio rule established by the Federal Communications Commission (FCC) which requires a frame length for unlicensed PCS equipment of 10 ms/N (where N is an integer≧1). Accordingly, the use of MUX3 for CT2 portable initiated calls must be avoided. Furthermore, non-synchronous transmissions, such as MUX3, create interference which can degrade performance and/or traffic capacity. A system using synchronous transmissions would reduce interference and improve system capacity. Hence, there is a need for an apparatus and method that provides and supports a synchronous link initiation from a portable to a base.

DETAILED DESCRIPTION OF THE PREFERRED EMBODIMENT

Figure 1:
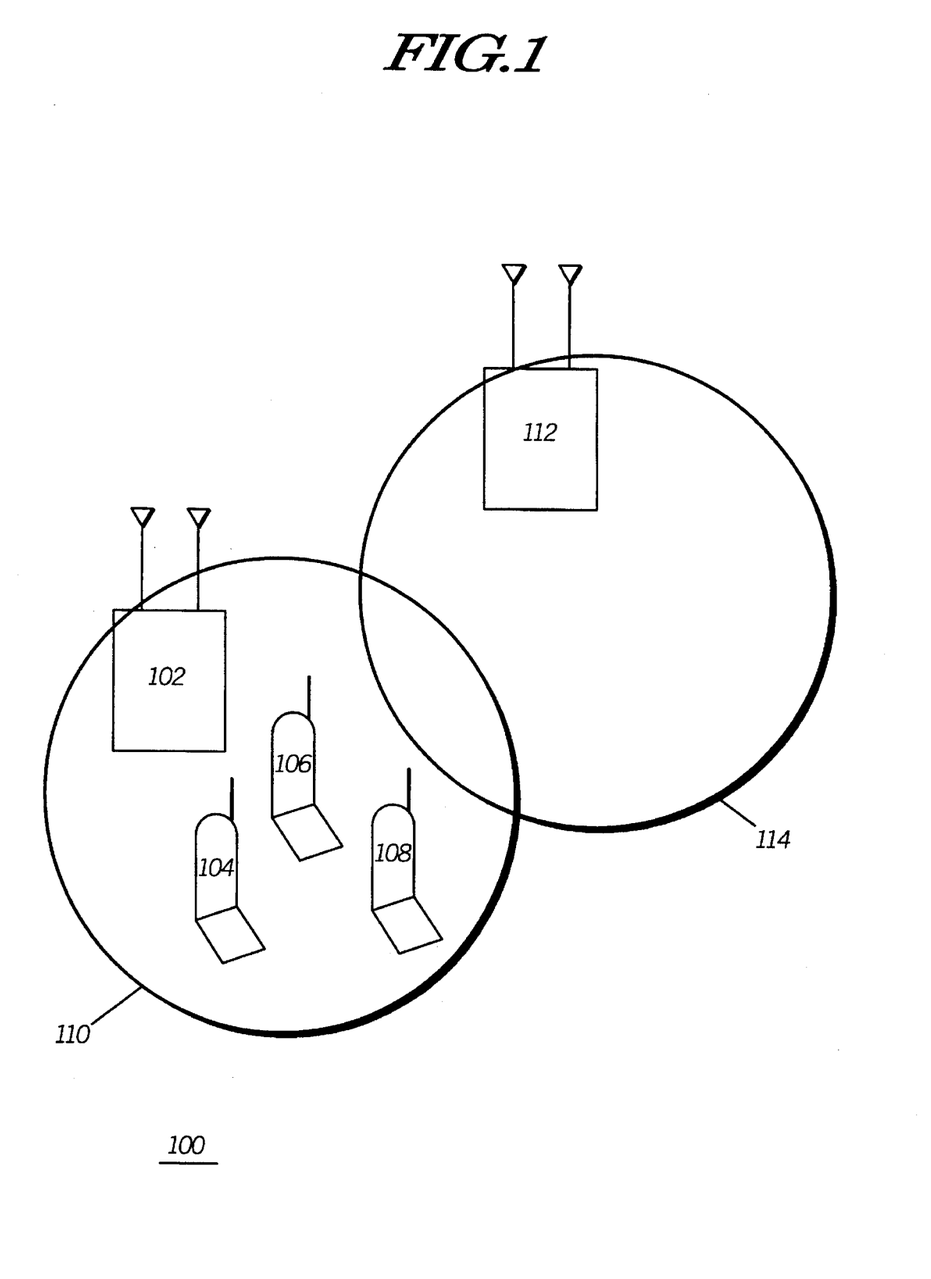
FIG. 1 is a drawing of a communication system in accordance with the present invention.

Referring now to FIG. 1 of the accompanying drawings, a communication system 100 is shown. The system 100 is preferably a CT2 system and is comprised of base stations 102 and 112 each having coverage areas, or cells, 110 and 114 respectively. Also included in the CT2 system 100 is a plurality of handsets 104, 106, and 108 located within coverage area 110. In the preferred embodiment of the invention, a communication link is to be initiated from at least one portable (104, 106, and/or 108) to the base station 102. The communication link shall be established without the use of the MUX3 protocol format.

Since the base 102 cannot synchronize to a portable and MUX3 must be avoided, it is necessary to facilitate portable link initiation in MUX2 using the base's synchronization. Synchronization provides a means to distinguish between the transmit and receive time frames. Since the portables 104, 106, 108 cannot maintain the base's synchronization without receiving data from the base 102, a 'marker' is transmitted from the base which allows the portables 104, 106, 108 to gain synchronization before initiating a link. In order for the portables 104, 106, 108 to differentiate between the base they are attempting to contact, for example base 102, and other bases, such as base 112, the marker includes the base's unique identification code. To overcome the necessity of the base 102 transmitting the portable's unique code (one for every portable it may encounter), the base preferably includes a generic code in the marker which will invite portables 104, 106, 108 to gain synchronization. The generic code is a code that is recognizable by all handsets that allows them to initiate link requests in MUX2. The generic code may comprise binary data, such as a 10 bit code. All portables 104, 106, 108 will recognize the generic code for the purposes of synchronization but will use a portable identification code unique to each portable for link initiation. Once invited to synchronize by the base's marker, the portables 104, 106, 108 will transmit link requests in MUX2 using their respective portable identification codes.

Since all portables 104, 106, 108 may equally respond to the marker, it is possible that portables may experience collisions (all respond at the same time thus corrupting the data they transmit). When this occurs each portable 104, 106, and 108 will cease transmissions and wait a random amount of time as determined by a counter. The portables 104, 106, and 108 then re-attempt synchronization and link initiation at different times with a greatly reduced probability of collision. The count time is a random length of time controlled by software for the individual portable 104, 106, 108 and may vary for each collision occurrence.

The base 102 will verify that the portable's identification code is valid, cease transmission of the marker, and return a link grant to the portable with the shortest count time, possibly portable 104. At this point a link is established in the MUX2 format, as well as the subsequent MUX1.2 format or MUX1.4 format, which has a transmit-to-receive ratio of 1:1. If the base 102 continues to transmit the marker and does not respond with a link grant, the portable 104 will discontinue link requests after a time-out and resume searching for another marker.

Additionally, the base's marker may include a sequencing code which forces portables 104, 106, 108 to enter a queue for access, thus reducing the chance of collision. The sequencing code continually increments, and rolls over, to allow the portables 104, 106, 108 to compare this code with preferably the least significant portion of their respective unique portable identification code. When a portable detects a match, it transmits a link request in response. Since the least significant portion one portable's code has a high probability of being different from another portable's code, collisions are greatly reduced. The range and rate of change of the sequencing code is such that no significant delay results from the matching activity and link initiation time is not noticeably impacted.

Figure 2:
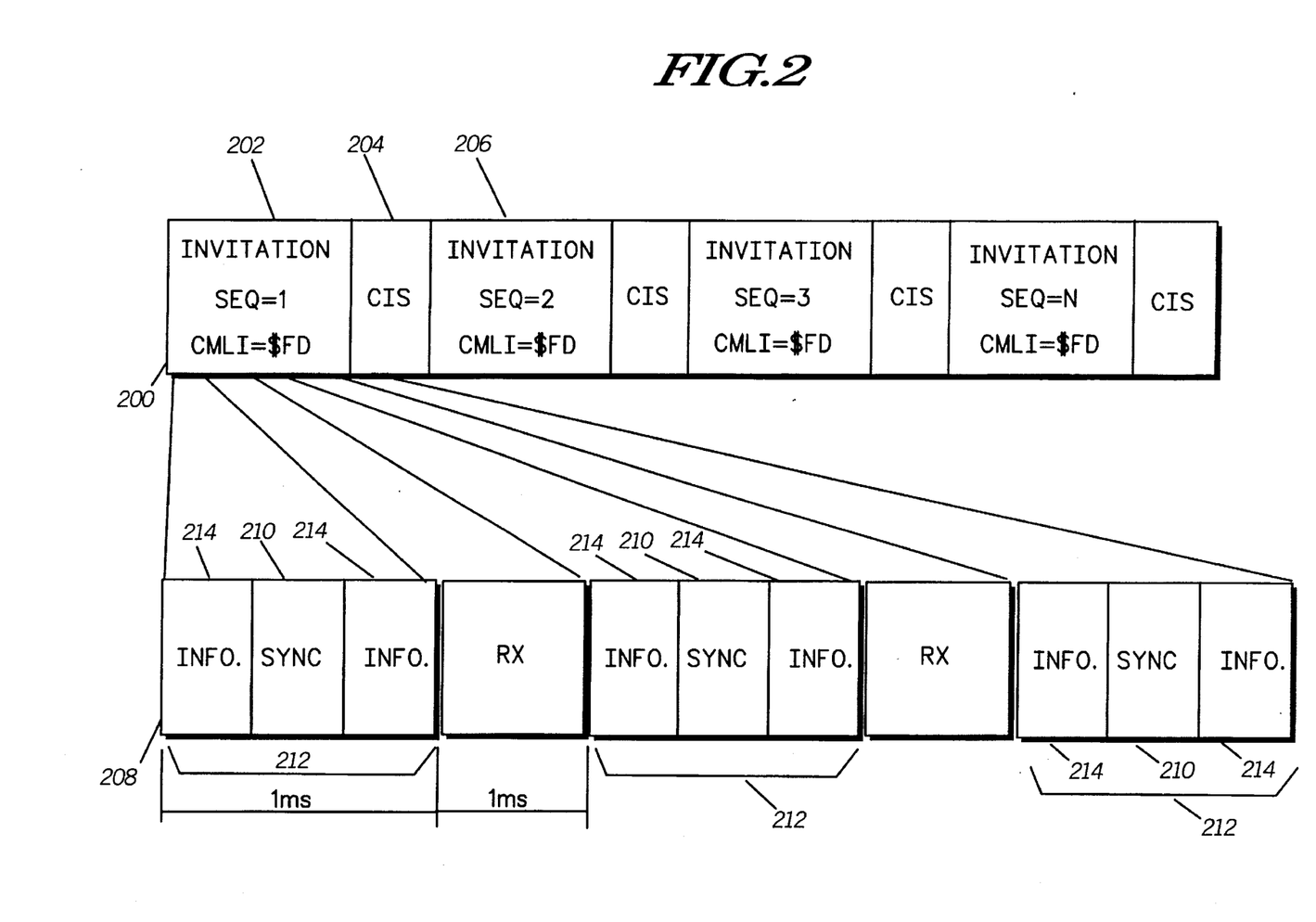
FIG. 2 is a protocol format m accordance with the present invention.

An example of a base transmission is shown in FIG. 2 of the accompanying drawings. An information stream 200 is transmitted by the base with protocol format 208. The information stream includes an invitation, or marker, 202. The marker 202 includes the generic code, also known as channel marker link identity (CMLI) for inviting a handset to request a link. The CMLI in this example is set to binary code, $FD. Also included within marker 202 is the sequence code (in this case 1) that provides an order line up (or queue) for the handset. Other general information is transmitted in an information and status code word (CIS) block 204 as defined in the CAI protocol. When the next transmission of an invitation occurs, the same generic invitation (CMLI) is sent, but the sequence code gets incremented as shown in block 206. So, the handset can synchronize to the marker 202 and wait until the sequence code, which is periodically updated preferably by a counter, matches a predetermined portion of the handset's own unique identification code. It is not essential that the whole handset identification code be compared to the sequence code, only a portion of the handset identification code, such as the four least significant bits, may be used in the comparison. Verifying the four least significant bits provides enough uniqueness without being cumbersome and time consuming to the process of link initiation. This speeds up the time to complete the link initiation while still providing a reduced collision rate. Also included but not shown in blocks 202, 204 is information such as a local area identifier (LAI) indicating the cell within which the base is located and a unique base identification code (LID). The base typically uses a 1 millisecond transmit/1 millisecond receive (1 ms TX/1 ms RX) frame as shown by format 208. A synchronization pattern 210 is interleaved within the TX frames 212 with three TX frames 212 typically making up an invitation block such as 202 and CIS block 204. The information contained in blocks 202 and 204 may be spread throughout information (info.) portions 214 of the TX frames 212 and transmitted along with the synchronization (sync.) pattern 210.

Figure 3:
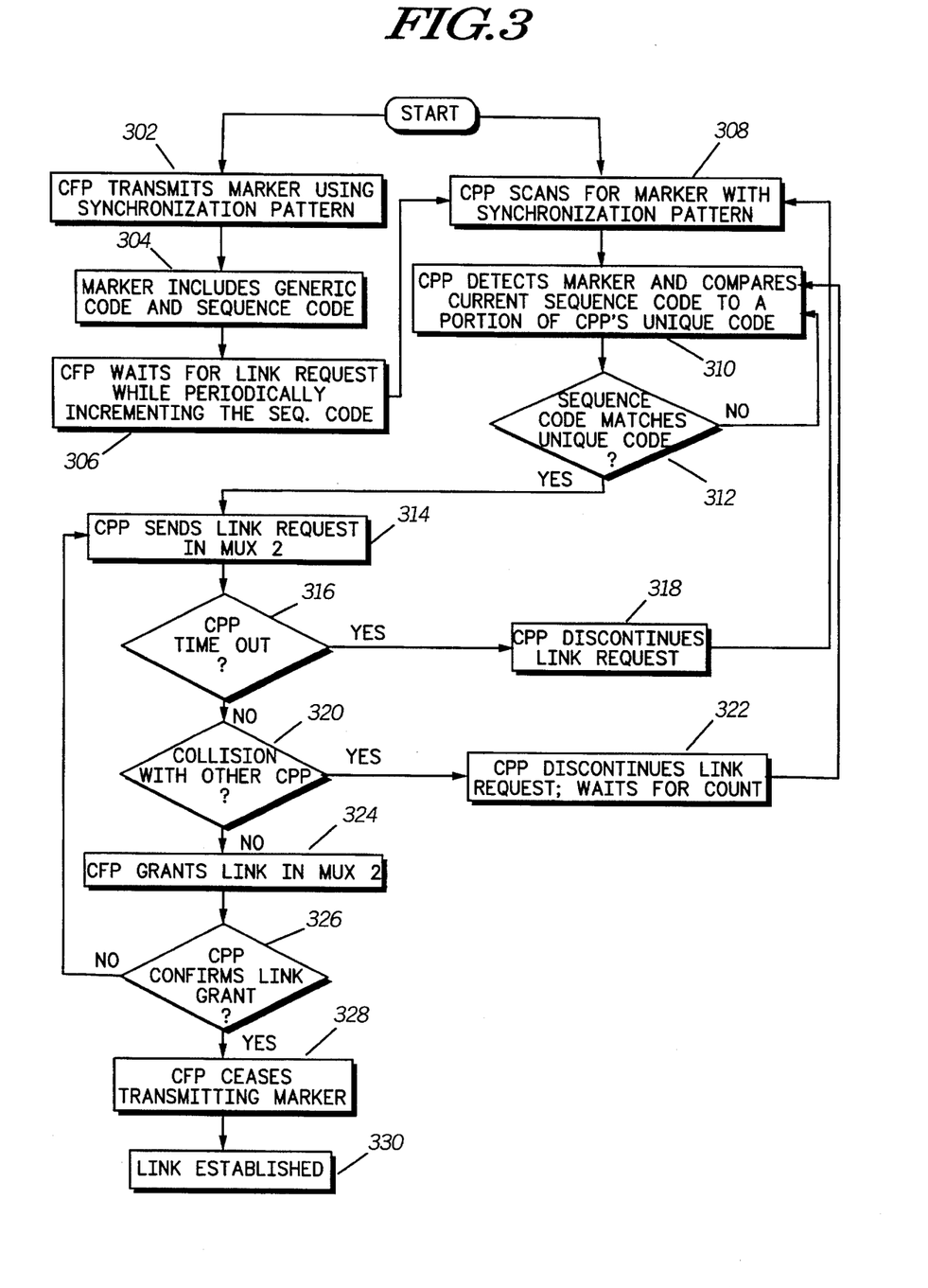
FIG. 3 is a flowchart of the preferred embodiment in accordance with the present invention.

A flowchart showing the preferred method for initiating a communication link from a portable is shown in FIG. 3 of the accompanying drawings. Flowchart 300 begins with a base station, also known as a cordless fixed part (CFP), transmitting a marker using a synchronization pattern at step 302. The marker includes both a generic code for inviting a handset to initiate a link, as well as a sequence code for placing the handset in queue in step 304. In step 306, the CFP waits for a link request and the flowchart 300 proceeds to step 308 which was started at the initiation of the flowchart. At step 308 the handset, or cordless portable part (CPP), scans for a synchronization pattern. Once a synchronization pattern is detected the CPP compares the sequence code to a portion of the CPP's own identification (ID) code, unique to each CPP in step 310. If the sequence code does not match the CPP identification code the routine returns to step 310, (the CPP still synchronized to the same marker), where the sequence code is incremented prior to being checked again at step 312. This sequencing loop (steps 310, 312) basically forces the CPP to "wait its turn".

Once the sequence code matches the identification code (or a predetermined portion of the identification code) in step 312 the portable sends a link request in MUX2 to the base at step 314. A time out feature monitors the CPP at step 316 to determine if too much time has elapsed from the start of the routine without any response from the CFP. When the time out has elapsed, the CPP discontinues the link request at step 318 and returns to step 308 to find a new marker and re-synchronize.

When the time out has not expired at step 316, a check for collisions with other CPP link requests is done at step 320. If a collision takes place at step 320, the CPP discontinues the link request and waits for a random count at step 322 generated in software prior to returning to step 310. Back at step 310 the CPP is still synchronized to the same marker but checks the next current sequence code.

If no collision takes place at step 320, the CFP sends a link grant in MUX2 to the CPP in step 324. The link grant is confirmed in step 326, and if no link was granted, the CPP sends another link request by returning to step 314. Once the link grant is sent from the CPP at step 324, the CFP ceases to transmit a marker at step 328 and a link is established between the CPP and the CFP at step 330. Thus, a link is established between a portable and a base station with the portable initiating the link request in a synchronous format.

It can be seen by those skilled in the art that the invention as described above is not so limited. For example, the base's marker may employ synchronization words to differentiate between polling and call initiation. Polling is the process by which the base alerts or informs handsets to an incoming call. The use of different synchronization words allows portable radios, or handsets, to ignore 'markers' when scanning frequencies for incoming calls and concentrate on polling. The ability to ignore markers when not initiating a link allows a handset to scan more quickly, reduce its scan time and increase its battery life.

Figure 4:
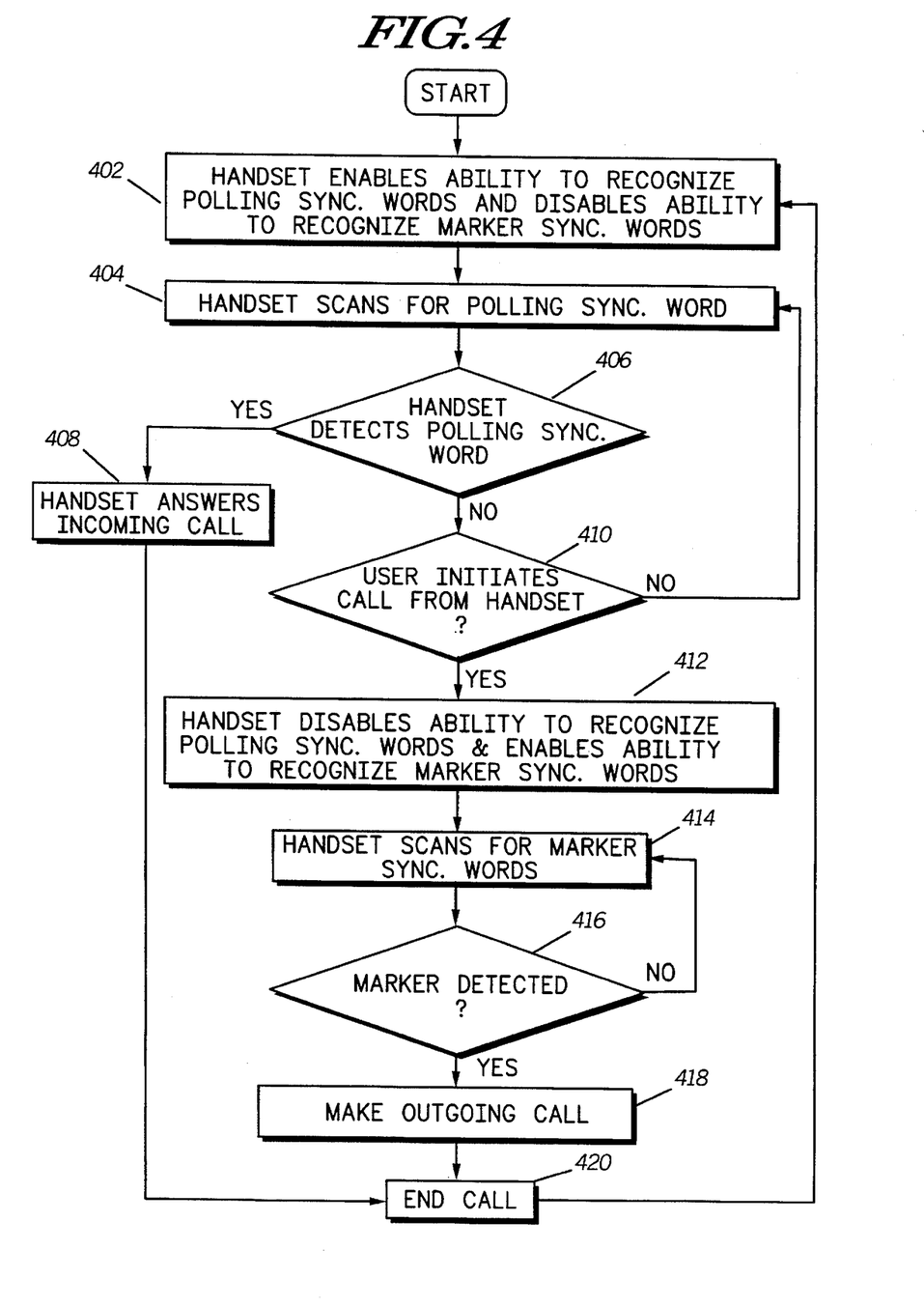
FIG. 4 is a second flowchart in accordance with the present invention.

A suggested sequence for implementing call initiation from a handset while in the polling environment with the use of synchronization words is shown in FIG. 4 of the accompanying drawings. Initially, in step 402 the handset is not engaged in link initiation and thus disables it's ability to recognize marker synchronization words and enables its ability to recognize polling synchronization words. The handset then scans for a polling synchronization word in step 404. If the polling synchronization word is detected in step 406, the handset answers the incoming call in step 408. If no polling synchronization word is detected in step 406, the handset determines if a user is initiating a call from the handset in step 410. If no call is being initiated, the handset returns to step 404 to scan for polling synchronization words. If a call is initiated in step 410, the handset disables its ability to detect polling synchronization words and enables its ability to detect marker synchronization words in step 412. The handset then scans for a marker in step 414 and continues to scan until a marker is detected. Once a marker is detected in step 416, an outgoing call can be made by the handset in step 418. The call ends at step 420 and the routine is started over at step 402.

The apparatus and method for initiating a communication link as described by the invention provides the advantage of employing a synchronous protocol that allows for greater traffic capacity and reduced interference as compared to a non-synchronous protocol that limits channel availability. The handset is not required to scan for free channels when initiating a link and the base does not have to scan for link initiations from the handsets. Because of the reduction in required scanning, faster communication links between the handset and the base are established. Overall transmissions from the handsets are reduced since handsets only transmit when a valid base is available, thus reducing interference and preserving battery life. Because, the base assigns the channel and includes it in the marker, a more efficient use of spectrum within a cell is provided. Counters as described by the invention are preferably controlled by software and provide collision resolution of link requests. Collisions are further avoided by the use of the sequencing codes which place the handsets in queue. While the preferred embodiment of the invention describes link initiation from a handset using MUX2, any communication system employing a synchronization and data information exchange multiplex may apply the apparatus and, method as described by the invention. Modifications to existing systems can be provided by software, and thus the cost to implement the invention is negligible. The method for initiating a link request as described by the invention is compatible with existing CAI data structures and protocol.

What is claimed is:

1. A method for initiating a communication link from a plurality of handsets having handset identification codes to a base station having a base station identification code without using MUX3, the method comprising the steps of:

generating a synchronization pattern from the base station in MUX2;

detecting the synchronization pattern at least one of the plurality of handsets;

synchronizing the at least one of the plurality of handsets to the base station in response to the synchronization pattern;

initiating communication link requests in MUX2 when a portion of the handset verification codes from the at least one of the plurality of handsets has a predetermined relationship with a portion of the synchronization pattern;

verifying if a collision of the communication link occurs;

dropping the communication link requests from the at least one of the plurality of handsets when a collision occurs;

waiting a predetermined time at each of the at least one of the plurality of handsets;

re-attempting link initiation from the at least one of the plurality of handsets after waiting the predetermined time for each of the at least one of the plurality of handsets; and granting a communication link from the base station in MUX2 including the base station identification code to one of the plurality of handsets when no collision occurs during the step of verifying.

2. A method for initiating a communication link from a plurality of handsets having handset identification codes to a base station having a base station identification code without using MUX3, the method comprising the steps of:

generating a synchronization pattern from the base station in MUX2;

detecting the synchronization pattern at least one of the plurality of handsets;

including a marker within the synchronization pattern, the marker including a sequence code;

synchronizing the at least one of the plurality of handsets to the base station in response to the synchronization pattern;

comparing at the at least one of the plurality of handsets, the sequence code to the handset identification codes once synchronization is established;

initiating communication link requests when the sequence code matches a predetermined portion of the handset identification codes;

verifying if a collision of the communication link occurs;

dropping the communication link requests from the at least one of the plurality of handsets when a collision occurs;

waiting a predetermined time at each of the at least one of the plurality of handsets;

re-attempting link initiation from the at least one of the plurality of handsets after waiting the predetermined time for each of the at least one of the plurality of handsets; and granting a communication link from the base station in MUX2 including the base station identification code to one of the plurality of handsets when no collision occurs during the step of verifying.

3. A method as described in claim 2, further comprising the step of incrementing the sequence code prior to the step of returning.

4. A method as described in claim 3, further comprising the step of discontinuing the step of initiating communication link requests after predetermined time out.

5. A method for initiating a communication link between one handset of a plurality of handsets, each handset of the plurality of handsets having a portable identification code (PID), and a base station having a base station identification code (CID), the method comprising the steps of:

transmitting synchronization data from the base station during outbound time slots, the synchronization data indicating that inbound time slots are available for communication, the synchronization data including the CID;

detecting the synchronization data at the one handset;

synchronizing the one handset to the base station in response to the synchronization data;

transmitting during the inbound time slots a link request from the one handset to the base station in response to the synchronization data, the link request including the PID; and initiating the communication link in response to the link request.

6. A method as recited in claim 5 wherein the step of transmitting the synchronization data includes the step of transmitting a channel marker (CHMF) and wherein the step of detecting comprises the step of detecting CHMF at the one handset.

7. A method as recited in claim 6 wherein the step of transmitting CHMF includes transmitting a generic code inviting a handset of the plurality of handsets to initiate a link.

8. A method as recited in claim 5 further comprising the steps of transmitting a link grant during the outbound time slots from the base station to the handset in response to the link request.

9. A method as recited in claim 8 further comprising the steps of re-transmitting the link request if the link grant is not received.

10. A method as recited in claim 5 further comprising the steps of:

after transmitting the link request, determining if a collision of the communication link has occurred;

waiting a predetermined time at the one handset; and re-attempting link initiation from the one handset.

11. A method as recited in claim 10 wherein the step of re-attempting link initiation comprises the steps of:

detecting the synchronization data at the one handset during the outbound time slots; and re-transmitting during the inbound time slots the link request from the one handset to the base station in response to the synchronization data, the link request including the PID.

* * * * *

UNITED STATES PATENT AND TRADEMARK OFFICE
CERTIFICATE OF CORRECTION

PATENT NO. : 5,561,852   Page 1 of 2
DATED : October 1, 1996
INVENTOR(S) : Heeschen et al.

It is certified that error appears in the above-indentified patent and that said Letters Patent is hereby corrected as shown below:

Claim 1

In column 5, line 66, please replace "pattern at least one" with --pattern at at least one--.

Claim 2

In column 6, line 30, please replace "pattern at least one" with --pattern at at least one--.

Claim 4

In column 6, line 64, please "after" with --after a--.

Claim 5

In column 6, line 65, please replace "A" with --In a communication system including a plurality of handsets and a base station, each handset of the plurality of handsets having a portable identification (PID) and the base station having a base identification code (CID)--, and also, replace "between" with --by--.

In column 6, line 66 through column 7, line 1, please delete "of a plurality of handsets, each handset of the plurality of handsets having a portable identification code (PID)".

UNITED STATES PATENT AND TRADEMARK OFFICE
CERTIFICATE OF CORRECTION

PATENT NO. : 5,561,852
DATED : October 1, 1996
INVENTOR(S) : Heeschen et al.

It is certified that error appears in the above-indentified patent and that said Letters Patent is hereby corrected as shown below:

In column 7, line 1, please replace "and a" with --with the--.
In column 7, lines 2-3, please replace "having a base station identification code (CID)" with --for originating a call from the one handset without using MUX 3--.

Signed and Sealed this

Twenty-second Day of July, 1997

Attest:

Attesting Officer

BRUCE LEHMAN

Commissioner of Patents and Trademarks